United States Patent
Fradet et al.

(10) Patent No.: US 10,055,893 B2
(45) Date of Patent: Aug. 21, 2018

(54) METHOD AND DEVICE FOR RENDERING AN IMAGE OF A SCENE COMPRISING A REAL OBJECT AND A VIRTUAL REPLICA OF THE REAL OBJECT

(71) Applicant: THOMSON LICENSING, Issy les Moulineaux (FR)

(72) Inventors: Matthieu Fradet, Chanteloup (FR); Philippe Robert, Rennes (FR); Anthony Laurent, Vignoc (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 15/588,875

(22) Filed: May 8, 2017

(65) Prior Publication Data
US 2017/0337741 A1 Nov. 23, 2017

(51) Int. Cl.
*G06T 19/00* (2011.01)
*G06T 17/10* (2006.01)
(Continued)

(52) U.S. Cl.
CPC .......... *G06T 19/006* (2013.01); *G06T 11/001* (2013.01); *G06T 15/04* (2013.01);
(Continued)

(58) Field of Classification Search
CPC ......... G06T 19/006; G06T 15/04; G06T 1/60; G06T 15/205
See application file for complete search history.

(56) References Cited

U.S. PATENT DOCUMENTS

| 6,525,731 B1 * | 2/2003 | Suits | G06T 15/04 |
| | | | 345/421 |
| 7,159,866 B2 * | 1/2007 | Selph | A63F 9/0613 |
| | | | 273/157 R |

(Continued)

FOREIGN PATENT DOCUMENTS

EP 2546806 1/2013

OTHER PUBLICATIONS

Chen et al., "3-Sweep: Extracting Editable Objects from a Single Photo", ACM Transactions on Graphics, vol. 32, No. 6, Article 195, Nov. 2013, pp. 1-10.
(Continued)

*Primary Examiner* — Jeffrey Chow
(74) *Attorney, Agent, or Firm* — Brian J. Dorini; Patricia A. Verlangieri

(57) ABSTRACT

A method and device for rendering a scene including one or more real objects is described. A virtual object is associated with each real object, a virtual object associated with a real object corresponding to a virtual replica of this real object. The virtual replica is used to render a transformation that may be applied to the real object when for example hit by a virtual object, the virtual object then replacing the corresponding real object within the scene. To bring realism to the scene, texture information obtained from image(s) of the real object(s) is used to texture the visible part(s) of the transformed virtual object(s). The texture information is selected in the images by using information on the visibility of the parts of the real object(s) that correspond to the visible parts of the transformed virtual object(s).

15 Claims, 5 Drawing Sheets

(51) Int. Cl.
  *G06T 11/00* (2006.01)
  *G06T 15/04* (2011.01)
  *G06T 19/20* (2011.01)

(52) U.S. Cl.
  CPC .............. *G06T 17/10* (2013.01); *G06T 19/20* (2013.01); *G06T 2219/2021* (2013.01)

(56) References Cited

U.S. PATENT DOCUMENTS

| | | | |
|---|---|---|---|
| 7,465,230 B2* | 12/2008 | LeMay | G07F 17/32 273/138.1 |
| 9,183,676 B2 | 11/2015 | Mc Culloch et al. | |
| 2009/0129630 A1 | 5/2009 | Gloudemans et al. | |
| 2010/0302247 A1 | 12/2010 | Perez et al. | |
| 2016/0000515 A1 | 1/2016 | Sela et al. | |
| 2016/0175064 A1* | 6/2016 | Steinle | A61B 90/39 600/424 |
| 2016/0343176 A1* | 11/2016 | Ackley | G06K 9/18 |

OTHER PUBLICATIONS

Klein et al., "Parallel Tracking and Mapping for Small AR Workspaces", 2007 IEEE International Symposium on Mixed and Augmented Reality (ISMAR), Nara, Japan, Nov. 13, 2007, pp. 225-234.

Klein et al., "Parallel Tracking and Mapping for Small AR Workspaces", Youtube, http://www.youtube.com/, Nov. 28, 2007, p. 1.

Csongei et al., "ClonAR: Rapid Redesign of Real-World Objects", 2012 IEEE International Symposium on Mixed and Augmented Reality (ISMAR), Atlanta, Georgia, USA, Nov. 5, 2012, pp. 277-278.

Kitanovski et al., "Augmented Reality Mirror for Virtual Facial Alterations", 2011 18th IEEE International Conference on Image Processing (ICIP), Brussels, Belgium, Sep. 11, 2011 pp. 1093-1096.

Naik et al., "A Step Closer to Reality: Closed Loop Dynamic Registration Correction in SAR", 2015 IEEE International Symposium on Mixed and Augmented Reality (ISMAR), Fukuoka, Japan, Sep. 29, 2015, pp. 112-115.

Ogawa et al., "Representing Degradation of Real Objects Using Augmented Reality", IEEE International Symposium on Mixed and Augmented Reality (ISMAR), Munich, Germany, Sep. 10, 2014, pp. 285-286.

Leao et al., "Geometric Modifications Applied to Real Elements in Augmented Reality", 2011 XIII Symposium on Virtual Reality, Uberlandia, Brazil, May 23, 2011, pp. 96-101.

Ababsa et al., "Robust Camera Pose Estimation Using 2D Fiducials Tracking for Real-Time Augmented Reality Systems", ACM SIGGRAPH International Conference on Virtual Reality Continuum and its Applications in Industry, Jun. 16, 2004, pp. 2226-2229.

He et al., "Automatic 3D Face Texture Mapping Framework from Single Image", First International Conference on Internet Multimedia Computing and service (ICIMCS), Kunming, Yunnan, China, Nov. 23, 2009, pp. 123-128.

* cited by examiner

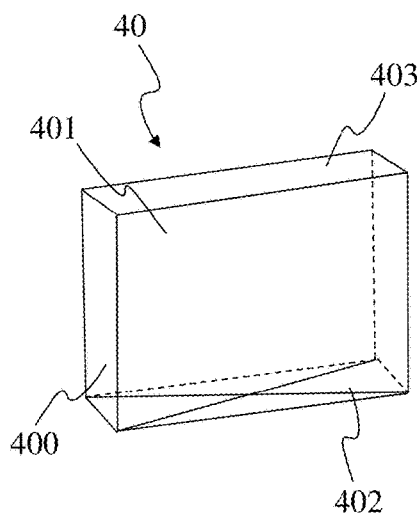
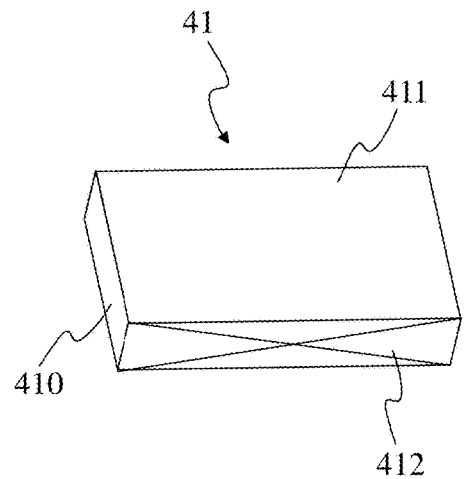
Fig 4A
Fig 4B
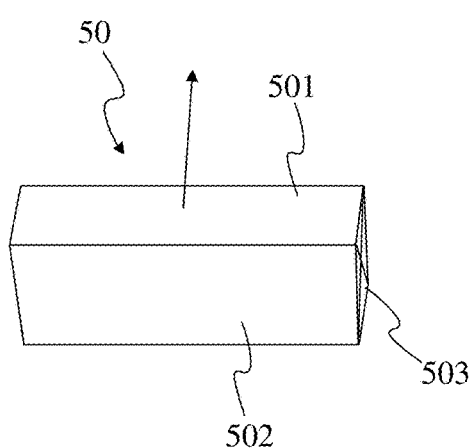
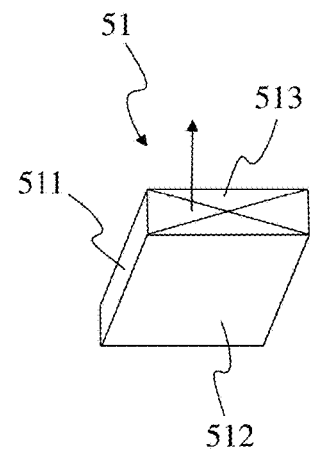
Fig 5A
Fig 5B

METHOD AND DEVICE FOR RENDERING AN IMAGE OF A SCENE COMPRISING A REAL OBJECT AND A VIRTUAL REPLICA OF THE REAL OBJECT

1. REFERENCE TO RELATED EUROPEAN APPLICATION

This application claims priority from European Patent Application No. 16305579.1, entitled, "METHOD AND DEVICE FOR RENDERING AN IMAGE OF A SCENE COMPRISING A REAL OBJECT AND A VIRTUAL REPLICA OF THE REAL OBJECT", filed on May 20, 2016, the contents of which are hereby incorporated by reference in its entirety.

2. TECHNICAL FIELD

The present disclosure relates to the domain of image processing, for example in the context of augmented reality video content consumed on a mobile device such as for example a head-mounted display (HMD), a tablet or a Smartphone.

3. BACKGROUND

Augmented reality (AR) is a technology that allows virtual objects to be mixed, e.g. in real time, with real world objects in an augmented reality scene that may be represented in one or more images displayed on a display device, such as a head-mounted display (HMD), a tablet, a Smartphone or a television display screen. This technology is also called mixed reality.

Interactions between the real and virtual objects of the AR scene may happen, for example when a virtual object moves in the AR scene and hits one or more real objects. For example, if a real scene is composed of a card box laid on a table and is augmented with a virtual sphere rolling on the table, it is expected that, when the sphere will collide the box, not only the sphere trajectory may be modified but also the box may move (from some slight oscillations to a strong projection depending on the weights and the velocities of the objects). Leão et al. discuss in "*Geometric modifications applied to real elements in augmented reality*" (2011 XIII Symposium on Virtual Reality) an AR system capable of performing modifications in real objects, in real time, aiming at providing realistic means of interaction among real and virtual objects.

FIG. 1A shows an example of an image 10 representing a real scene used in the AR system of Leão et al, the scene comprising real objects among which a real object 100. The real object 100 corresponds to a cube, e.g. a card box. A marker 101 is applied on a face of the real object 100, the marker 101 being used to get the camera position in the real world with regard to the real object, for proper insertion of virtual object. FIG. 1B shows an image 11 into which the real object 100 is replaced with a virtual replica 110 of the real object 100, a deformation being applied to the virtual replica 110. The virtual replica 110 is, for example, obtained by using a 3D model of the real object 100. The virtual replica 110 is textured by using a dynamic texture obtained from the image 10 of the real object 100. In the original scene 10, the top surface of the real object 100 is occluded by the real object 100 itself, and in the AR scene of the image 11, the upper face 112 is displayed, with an incorrect texture. The texture of the visible face of the real object 100 that comprises the marker 101 is retrieved from the image 10 and reused as texture information for the front face 111 and the upper face 112 of the virtual replica 110, leading to an issue regarding the realism of the image 11.

4. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of rendering a scene comprising at least one real object, the method comprising:
- receiving at least one image representative of the scene;
- applying a transformation to a virtual object corresponding to a virtual replica of the at least one real object;
- rendering, in the at least one image, at least one first part of the transformed virtual object by using texture information associated with the real object in the at least one image, the texture information being selected according to an information representative of visibility in the at least one image associated with at least one second part of the real object corresponding to said at least one first part of the transformed virtual object.

According to a particular characteristic, the rendering comprises:
- selecting the texture information associated with the at least one second part of the real object when the at least one second part is visible in the at least one image;
- selecting the texture information associated with at least one third part of the real object when the at least one second part is not visible in the at least one image.

According to a specific characteristic, the virtual object is modelled with a mesh, the at least one third part being obtained by using a relationship between at least one vertex of a part of the mesh associated with the at least one third part and at least one vertex of a part of the mesh associated with the at least one second part.

According to another characteristic, the relationship is established based on the normal associated with the vertices of the mesh.

According to a particular characteristic, the relationship is established with color information associated with mesh elements of the mesh.

According to a specific characteristic, the texture information is obtained from a texture map updated with texture data of a plurality of images representative of the scene, a timestamp being associated with the texture data, the timestamp depending from the image of the plurality of images used to update the texture map.

According to a particular characteristic, the updating of the texture map is dependent from at least one of the following information:
- normal associated with the at least one first part associated with the texture data;
- timestamp information associated with the texture data;
- position of an acquisition device with regard to the at least one real object.

The present disclosure also relates to a device configured to render a scene comprising at least one real object, the device comprising a memory and at least one processor configured to perform the operations of the abovementioned method of rendering a scene comprising at least one real object.

The present disclosure also relates to a multimedia/communication terminal configured to render a scene comprising at least one real object.

The present disclosure also relates to a computer program product comprising instructions of program code for executing, by at least one processor, the abovementioned method of rendering a scene comprising at least one real object, when the program is executed on a computer.

The present disclosure also relates to a (non-transitory) processor readable medium having stored therein instructions for causing a processor to perform at least the abovementioned method of rendering a scene comprising at least one real object.

5. LIST OF FIGURES

The present disclosure will be better understood, and other specific features and advantages will emerge upon reading the following description, the description making reference to the annexed drawings wherein:

FIG. 4A shows a transformation applied to the virtual object of FIG. 3, in accordance with an exemplary embodiment of the present principles;

FIG. 4B shows a transformation applied to the virtual object of FIG. 3, in accordance with another exemplary embodiment of the present principles;

FIG. 5A shows a transformation applied to the virtual object of FIG. 3, in accordance with another exemplary embodiment of the present principles;

FIG. 5B shows a transformation applied to the virtual object of FIG. 3, in accordance with another exemplary embodiment of the present principles;

Figure 7:
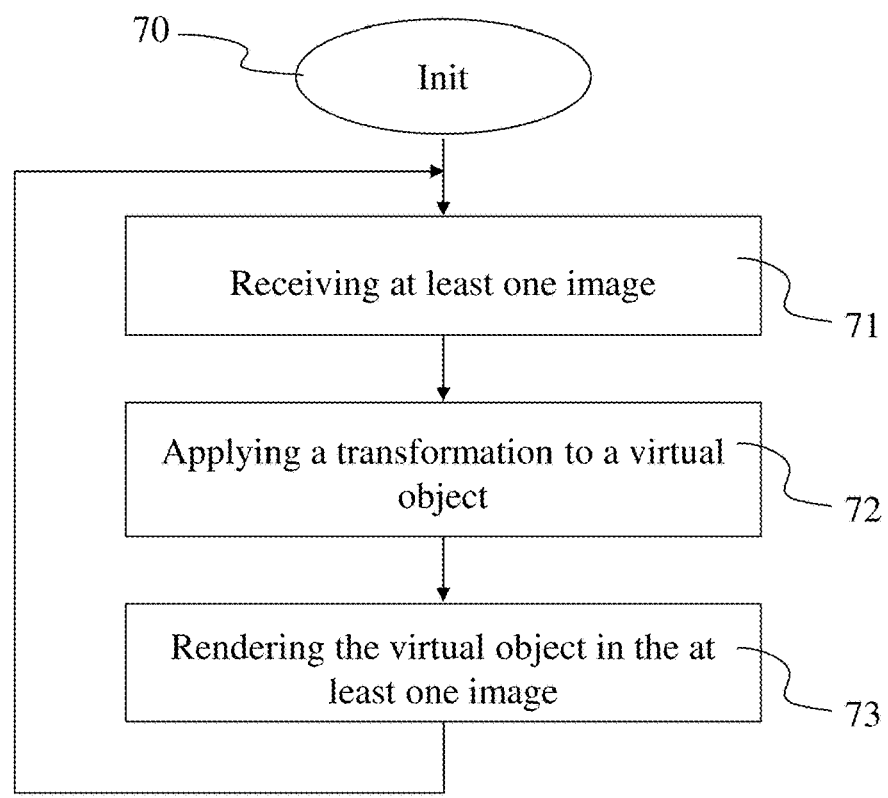
FIG. 7 shows a method of rendering a scene comprising a transformed representation of the real object of FIG. 2, in accordance with an exemplary embodiment of the present principles.
Figure 8:
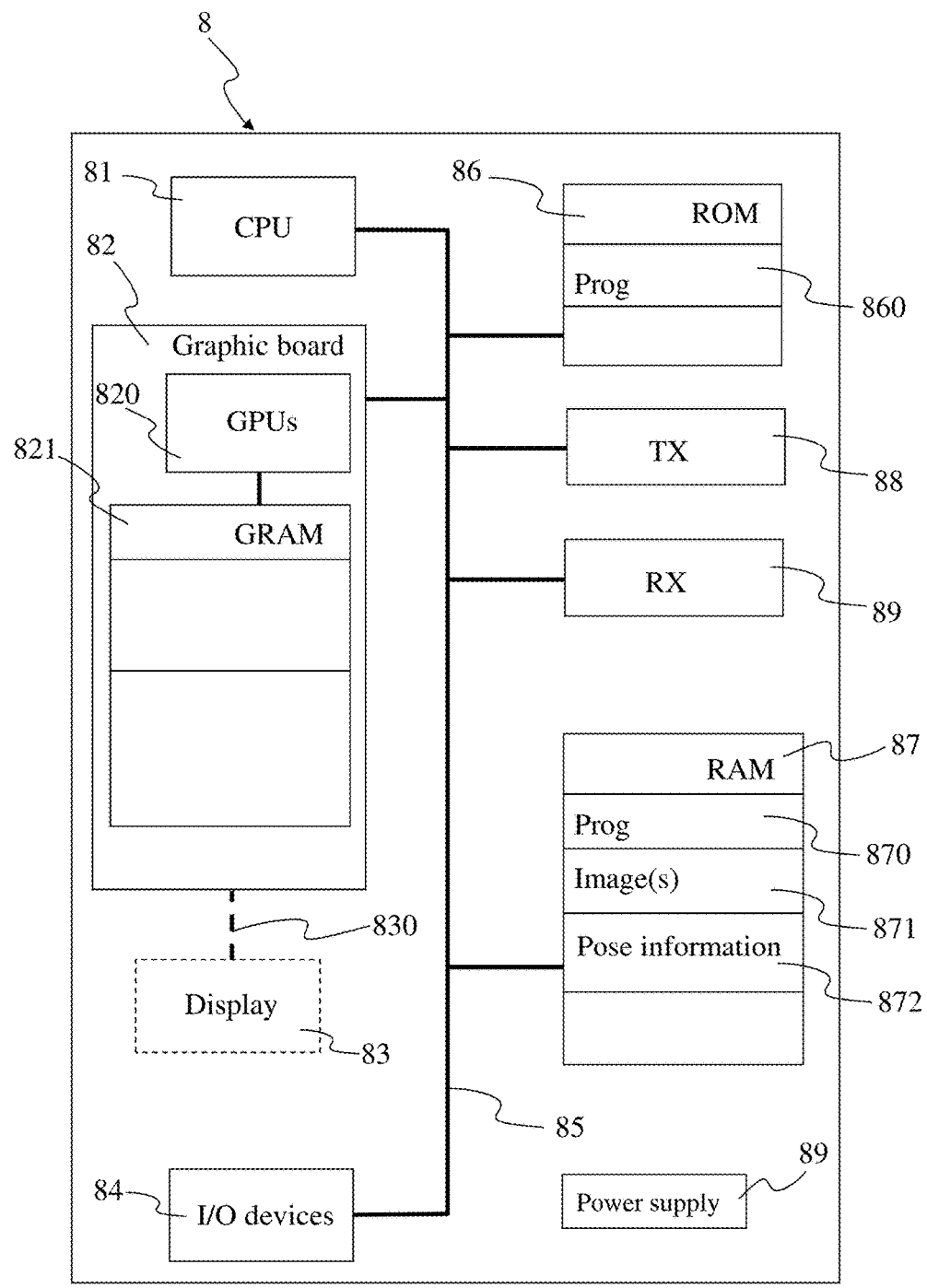

FIG. 8 diagrammatically shows the structure of an exemplary apparatus configured to implement the method of FIG. 7, in accordance with an exemplary embodiment of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present principles will be described in reference to a particular embodiment of a method of rendering a scene comprising one or more real objects. A virtual object is associated with each real object, a virtual object associated with a real object corresponding to a virtual replica of this real object. The virtual replica is used to render a transformation (i.e. translation and/or rotation and/or scaling) that may be applied to the real object when for example hit by a virtual object, the virtual object then replacing the corresponding real object within the scene. To bring realism to the scene, texture information obtained from image(s) of the real object(s) is used to texture the visible part(s) of the transformed virtual object(s). The texture information is selected in the images by using information on the visibility of the parts of the real object(s) that correspond to the visible parts of the transformed virtual object(s).

Figure 1A:
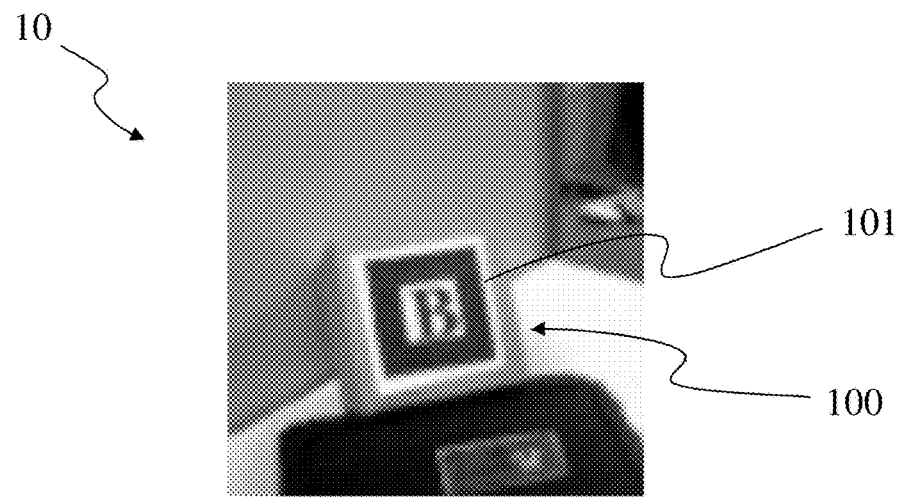
FIG. 1A shows an image of a real scene comprising a real object.
Figure 1B:
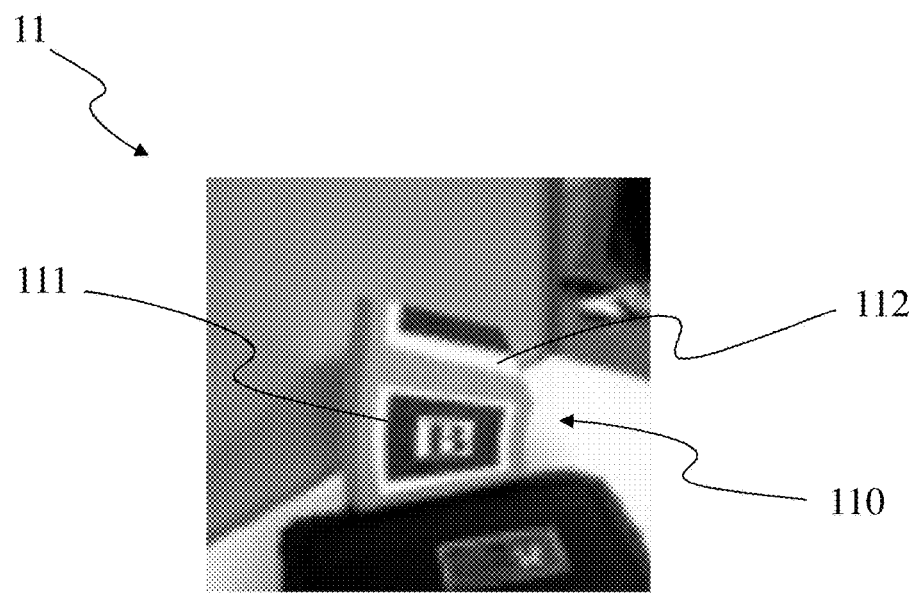
FIG. 1B shows an image of an augmented reality scene comprising a virtual object corresponding to the real object of FIG. 1A, in accordance with the background.
Figure 2:
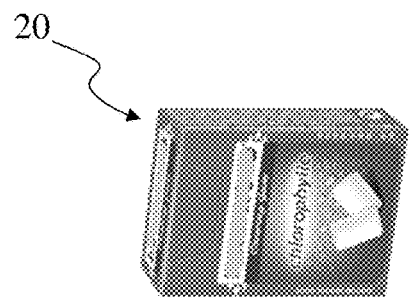
FIG. 2 shows an image of a real object, in accordance with an exemplary embodiment of the present principles.
Figure 2:
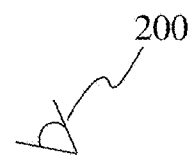

FIG. 2 shows a real object 20 of a real scene, according to a particular and non-limiting embodiment of the present principles. In the example of FIG. 2, the real object 20 is a pack of chewing gum having the general shape of a rectangular parallelepiped. Naturally, the real object 20 is neither limited to the example of a pack of chewing gum nor to an object having a general shape of a rectangular parallelepiped, but extends to any real object of any shape, for example a ball, a table, a pyramid.

One or more images of the real scene are acquired with an acquisition device 200 located in the real world, for example a camera or a webcam. The pose of the acquisition device 200 is for example determined by image processing, for example by tracking in the image(s) of the real scene fiducial marker located on the real object or near the real object. Such a method is as described for example by Fakhr-eddine Ababsa et al. in "Robust Camera Pose Estimation Using 2D Fiducials Tracking for Real-Time Augmented Reality Systems" in ACM SIGGRAPH VRCAI, 2004, pp. 2226-2229. The pose comprises the location (e.g. coordinates) and the orientation of the acquisition device in the space of the real scene, i.e. in the world space. An ArUco software in OpenCV, combined with a board of fiducial markers, may be used to determine the pose of the acquisition device 200. According to another example, markers using the ARToolKit library may be used to determine the pose of the acquisition device 200. According to another example, graphical properties of the real object may be used as marker, e.g. specific elements of the texture of the real object 20 (e.g. the word "chlorophylle" or the graphical representation of the pieces of chewing gum).

Figure 3:
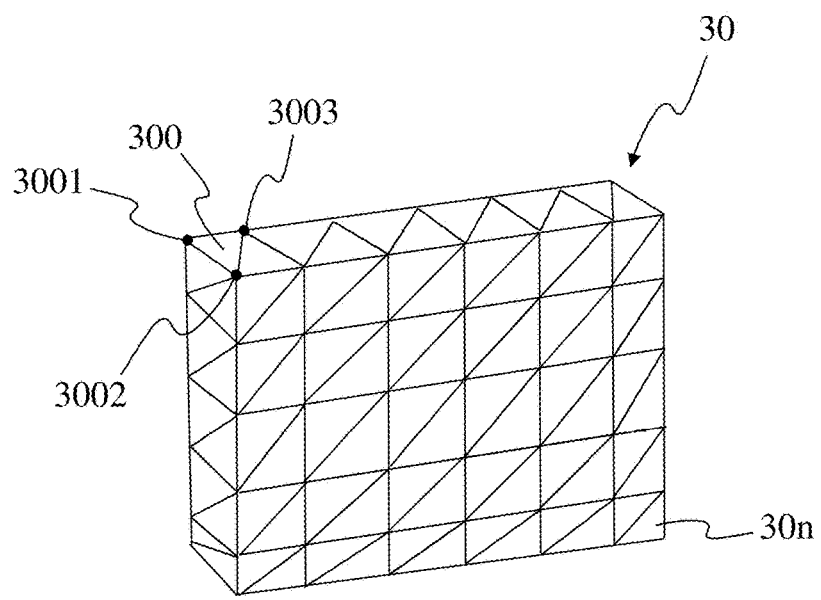
FIG. 3 shows a representation of a virtual object corresponding to the real object of FIG. 2, in accordance with an exemplary embodiment of the present principles.

FIG. 3 shows a virtual object 30 corresponding to the virtual replica of the real object 20, according to a particular and non-limiting embodiment of the present principles. The virtual object 30 is for example obtained by retrieving a 3D model corresponding to the shape of the real object 20 from a library of 3D models. To reach that aim, the general shape of the real object is for example determined by analyzing the one or more images of the real scene comprising the real object acquired with the acquisition device 200. The general shape of the real object is for example determined by using any known tracking technique, being marker based (for example by detecting landmarks located on determined points of the real object, e.g. on the corners) or markerless (such as the ones based on edges detection or texture detection). According to a variant, the virtual object is generated manually, for example by polygonal modelling, in which the model is assimilated with a set of polygons (mesh elements), each polygon defined by the list of summits (i.e. vertices) and edges that compose it; by NURBS (Non-uniform rational basic spline) type curve modelling in which the model is defined by a set of curves created via control vertices; or by modelling by subdivision of surfaces. According to the non-limiting example of FIG. 3, the virtual object 30 is modelled with a mesh comprising mesh elements and vertices, i.e. triangles 300 to 30n, each triangle being associated with tree vertices. For example, the vertices 3001, 3002 and 3003 are associated with the mesh element (triangle) 300.

FIG. 4A shows a real object 40 and FIG. 4B shows a virtual object 41 corresponding to a virtual replica of the real object 40, according to a particular and non-limiting embodiment of the present principles. The real object 40 corresponds for example to the real object 20 and is represented in a simplified way, e.g. under the form of a rectangular parallelepiped. Some of the faces are identified with reference numbers on FIG. 4A, i.e. the left lateral face 400, the front face 401, the bottom face 402 (also highlighted with a cross) and the upper face 403. According to the example of FIG. 4A, the faces that are visible from the point of view of the acquisition device (not illustrated) acquiring one or more images of the real scene comprising the real object 40 are the left lateral face 400, the front face 401 and the upper face 403.

The visibility of a considered face of the real object in an image of the real object acquired with the acquisition device may be determined by comparing the normal $\vec{N}$ of the considered face with a vector $\vec{L}$, where $\vec{L}$ starts from a point of the considered face (e.g. the centre of the considered face) and ends at the acquisition device, the vector $\vec{L}$ being oriented toward the acquisition device. The centre and the normal of the considered face are for example determined from the 3D model of the real object 40, the 3D model being projected onto the real object 40 to match the real object 40 with the scene. According to a variant, the centre and the normal of the considered face are determined by processing the image, i.e. by determining the shape of the considered face (e.g. by using any known tracking method, being marker based or markerless). To determine the visibility of the considered face, the dot product (also called scalar product) of the vectors $\vec{N}$ and $\vec{L}$ is calculated. When the result of the dot product is strictly greater than 0 (i.e. strictly positive), then the considered face is visible. When the result of the dot product is less than or equal to 0 (i.e. negative), then the considered face is not visible.

FIG. 4B illustrates the virtual object 41 that corresponds to a virtual replica of the real object 40. The virtual object 41 is obtained by using the 3D model of the real object 40, for example the 3D model 30 of FIG. 3, and by using texture information retrieved from the image(s) of the real object 40 acquired with the acquisition device. A transformation is applied to the 3D model to obtain the virtual object 41 as illustrated on FIG. 4B, i.e. laying on the face corresponding to the face opposed to the front face 401 of the real object 40. The transformation applied to the 3D model enables one to reproduce the swaying of the real object 40 on its back face, making the bottom face 402 appear. The virtual object 41 is inserted into the real scene, for example in place of the real object 40. According to the point of view of the acquisition device used to acquire images of the real scene comprising the real object 40, the faces of the virtual object 41 that are visible are: the face 411 (that corresponds to the front face 401 of the real object 40), the left lateral face 410 (that corresponds to the left lateral face 400 of the real object 40) and the face 412, identified with a cross (that corresponds to the bottom face 402 of the real object 40). To bring realism to the virtual object 41, the texture mapped onto the visible faces of the virtual object is retrieved from the image(s) of the real object 40. The texture mapped onto the face 411 corresponds to the texture information of the front face 401 of the real object, as the face 411 is the virtual face corresponding to the real face 401 that is visible in the image of the real object 40. The texture mapped onto the face 410 corresponds to the texture information of the left lateral face 400 of the real object 40, as the face 410 is the virtual face corresponding to the real face 400 that is visible in the image of the real object 40. As the face 402 is not visible in the image of the real object 40, the texture mapped onto the virtual face 412 corresponding to the real face 402 cannot be the texture of the real face 402. Instead, the texture of the real face 403 is used to be mapped onto the virtual face 412, since the real face 403 is visible in the image of the real object 40. The texture information used to be mapped onto the visible face(s) of the 3D model of the virtual object 41 is selected in the image of the real object 40 corresponding to the virtual object 41 according to an information representative of visibility of the faces of the real object. The visibility information is for example a one-bit information associated with each face taking the value of 0 or 1, one of the values indicating that the associated face is visible and the other value indicating that the associated face is not visible.

To determine which part of the texture of the real object is used to be mapped on a virtual part of the virtual object, a mapping between different parts of the 3D model associated with the real object may be used. The mapping information may for example take the form of a LUT (Look-Up Table). Each part of the 3D model is for example identified with a unique index. A part corresponds for example to a whole face of the object (e.g., a parallelepiped when the shape is simple), to a mesh element or to a vertex (e.g., a sphere, a cylinder or a cone, when the shape is more complex). The mapping table comprises the allocation to each part of the 3D model of one or more other parts of the 3D model. Two different parts of the 3D model are allocated with each other in such a way as to minimize the risk that both parts are occluded simultaneously by the real object itself. For common convex shapes (e.g. box, sphere, cone, cylinder), a simple solution may be to allocate different parts that belong to opposite facets. When several different parts are allocated to a considered part, a preference criteria may be associated with the different parts. If the first preferred part is not visible, then the second preferred part is used. If the second preferred part is also not visible, then the third preferred part is used, and so on.

The mapping table may be generated manually as a pre-processing step, once and for all. According to a variant, the mapping table may be generated automatically, for example by using normal information associated with each part of the 3D model. For example, for a considered part of the 3D model, the other part(s) to be allocated to the considered part may be the one(s) that maximizes the absolute difference between its normal and the normal of the considered part.

The mapping table is used as follows. When texturing a virtual part of the virtual object, it is first checked whether the corresponding part of the real object is visible. If yes (i.e., the real object is visible), then the texture of the corresponding real part is used to be mapped onto the virtual part. If no (i.e., the real object is not visible), then the texture of the corresponding real part is retrieved from the first other part allocated to the real part in the mapping table. If this allocated first other part is visible, then the texture information of the real object associated with this first other part is used to be mapped onto the virtual part. If this allocated first other part is not visible, then a second other part is retrieved from the mapping table (if this second another part exists) and the texture information of the real object associated with this second other part is used (if visible) to be mapped onto the virtual part. This process is repeated until finding a part allocated with the corresponding part of the real object that is visible in the image of the real object.

According to a variant, when the texture of all parts of the real object is known (for example obtained from previous images or by using machine learning techniques to retrieve texture of a same real object stored in a library of textures of many different objects), the mapping table may be generated by using this texture information. For example, for a considered part of the 3D model of the real object, the other part(s) to be allocated to the considered part may be the one(s) that minimizes the difference between the mean color value associated with the considered part and the mean color value of the candidate other part(s). According to another variant, the mapping table is generated by using information regarding the normal (as explained hereinabove) and the texture.

FIG. 5A shows a real object 50 and FIG. 5B shows a virtual object 51 corresponding to a virtual replica of the real object 50, according to a particular and non-limiting embodiment of the present principles. The real object 50 corresponds for example to the real object 20 and is represented in a simplified way, e.g. under the form of a rectangular parallelepiped. Some of the faces are identified with reference numbers on FIG. 5A, i.e. the upper face 501, the front face 501 and the right lateral face 503 (also highlighted with a cross). According to the example of FIG. 5A, the faces that are visible according to the point of view of the acquisition device (not illustrated) acquiring one or more images of the real scene comprising the real object 50 are the upper face 501, the front face 502 and the right lateral face 503.

FIG. 5B illustrates the virtual object 51 that corresponds to a virtual replica of the real object 50. The virtual object 51 is obtained by using the 3D model of the real object 50, for example the 3D model 30 of FIG. 3, and by using texture information retrieved from the image(s) of the real object 50 acquired with the acquisition device. A transformation is applied to the 3D model to obtain the virtual object 51 as illustrated on FIG. 5B, i.e. laying on the face corresponding to the face opposed to the right lateral 503 of the real object 50. The transformation applied to the 3D model enables one to reproduce the swaying of the real object 50 on the left, making the right lateral side be the bottom face and the right lateral side 503 be the upper face. The virtual object 51 is inserted into the real scene, making the real scene an augmented reality scene. Faces of the virtual object 51 that are visible according to the point of view of the acquisition device used to acquire images of the real scene comprising the real object 50 are the face 511 (that corresponds to the upper face 501 of the real object 50), the front face 512 (that corresponds to the front face 502 of the real object 50) and the face 513, identified with a cross (that corresponds to the right lateral face 503 of the real object 50). The texture used to be mapped onto the front face 512 is the texture information of the front face 502 of the real object 50 obtained from the image representative of the real object 50 as the face 502 is clearly visible. The texture used to be mapped onto the left lateral side 511 is the texture information of the upper face 501 of the real object 50 that corresponds to the face 511, the face 501 being clearly visible. The texture used to be mapped onto the upper face 513 is not the texture of the corresponding face 503 of the real object. Even if visible, the face 503 is oriented in such a way that the interpolation that may be necessary to map its texture onto the face 513 may generate artifacts and poor results. In such a case and according to a non-limiting example, the texture used to be mapped onto the face 513 is the texture information of the real face 501, i.e. the face of the real object having the closest normal to the normal of the virtual face 513. According to a variant, the texture information to be mapped onto the virtual face 513 is the texture of the first visible face found when parsing the image of the real object 50. According to another variant, the texture information to be mapped onto the virtual face 513 is the texture of the most fronto-parallel face of the real object 50, for example determined by comparing the normal of the different visible faces of the real object 50. According to a further variant, the texture information to be mapped onto the virtual face 513 is the texture of the visible face of the real object whose direction to the light source is the closest to the direction to the light source of the virtual face 513. According to another variant, the texture information to be mapped onto the virtual face 513 is the texture of the visible face of the real object 50 spatially closest to the face 503.

According to an embodiment, the face of the real object used for texturing the virtual face 513 for a current frame (or image) representative of the augmented reality scene is used for the following frames (temporally speaking) as long as it remains visible enough (e.g. the level of visibility being determined by comparing the normal vector $\vec{N}$ associated with the real face with the vector $\vec{L}$ starting from the real face and ending at the location of the acquisition device).

Figure 6:
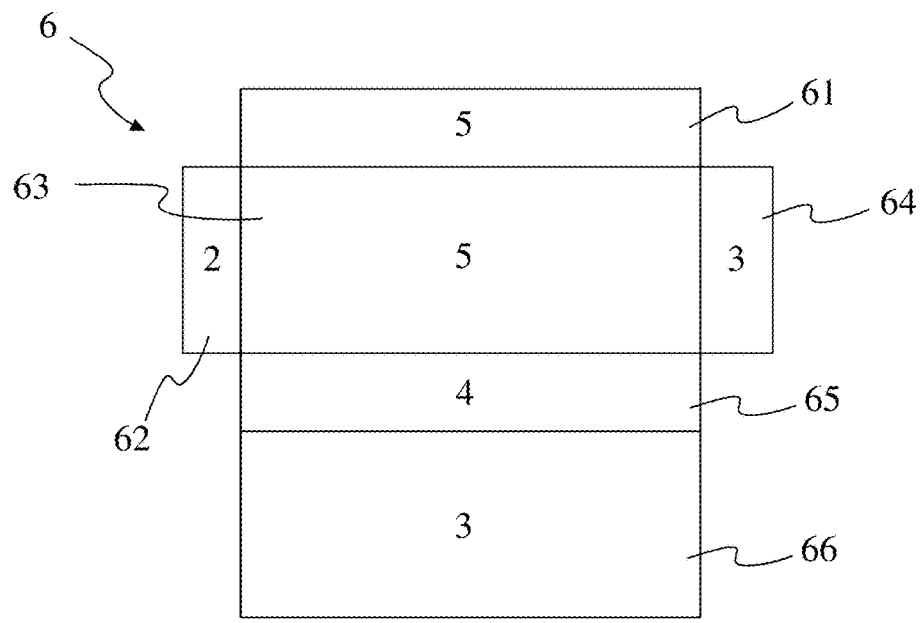
FIG. 6 shows a texture map used for texturing the transformed virtual object of FIG. 4B and FIG. 5B, in accordance with an exemplary embodiment of the present principles.

FIG. 6 shows a texture map 6 used for texturing the transformed virtual object 41 or 51, according to a particular and non-limiting embodiment of the present principles. The map 6 is a planar representation of the 3D model of the virtual object, each face of the 3D model being projected onto the plane to obtain corresponding parts 61 to 66 of the texture map 6, according to the cube mapping technique. Each part 61 to 66 of the texture map is subdivided into texture elements, each texture element being identified with its coordinates (u,v) in the texture map 6. The texture information associated with the texture elements is obtained from different images of the real object, the texture map 6 being updated when a face (and its texture information) is visible within an image of the real object. At initialization the texture map is empty and the texture map 6 is filled with texture information from frame to frame (i.e. from image to image of the real object) according to the visibility of the parts of the real objects corresponding to the texture elements of the texture map 6. Values of timestamps 2, 3, 4 or 5 may be associated with the different parts 61 to 66 of the texture map 6. The exemplary values 2, 3, 4 or 5 identify for example the frame number from which the texture information is obtained. For example, the texture information of the part 61 has been obtained from the frame number 5 (within a sequence of successive frames starting with frame number 0); the texture information of the part 62 has been obtained from the frame number 2; the texture information of the part 63 has been obtained from the frame number 5; the texture information of the part 64 has been obtained from the frame number 3; the texture information of the part 65 has been obtained from the frame number 4; and the texture information of the part 66 has been obtained from the frame number 3.

When a mapping table is used (as described with regard to FIGS. 4A and 4B), a part and its corresponding part of the texture map 6 may be updated simultaneously according to the mapping information comprised in the mapping table. The updating of the texture map depends for example from one or more information belonging to the following group of information:

- the normal associated with the visible part of the real object: according to the normal, the visibility of the considered part of the real object may be considered as better than the visibility of the same considered part in a previous frame used to update the corresponding part of the texture map;
- the value of the timestamp associated with the considered part of the texture map: when a part of the real object is visible in a current frame, the updating of the corresponding part of the texture map 6 may be performed according to the timestamp associated with this corresponding part of the texture map. If the texture information is considered as being too old, e.g. when the difference between the timestamp of the current frame and the timestamp associated with the corresponding part of the texture map is greater than a threshold, e.g. greater than 3, 4, 5 or 10 frames, the texture information obtained from the current frame may be used to replace the existing texture information of the corresponding part of the texture map 6;
- position of the acquisition device with regard to a considered visible part of the real object: if the acquisition device is close enough to the considered part of the real object (i.e. the distance between the location of the acquisition device and for example the centre or one vertex of the considered part is less than a determined value), meaning that the resolution of the texture of the considered part has an acceptable level of quality, then the corresponding part of the texture map is updated.

The texture information of the texture map 6 is used to texture the visible parts of the virtual object once transformed by using the well-known texture mapping technique.

For example, as discussed in Leão et al., each vertex of a non-transformed mesh corresponding to the real object is projected onto the image using projection and model view matrices, to use the dynamic texture obtained in real-time from the images of the real object itself. After being correctly mapped to the interval [0,1], the image/screen coordinates are used as texture coordinates.

FIG. 7 shows a method of rendering a scene comprising one or more real objects, according to a particular and non-limiting embodiment of the present principles. The rendering method is for example implemented in the device 8.

During an initialisation step 70, the different parameters of the device 8 are updated. In particular, the parameters of the 3D model are initialised in some way.

In a step 71, one or more images of the scene comprising the real object(s) are received. The images are for example received from an acquisition device. According to a variant, the one or more images are received from a storage device, for example a remote storage device or from a local memory of the device 8.

In a step 72, a transformation is applied to a virtual object that corresponds to a virtual replica of the real object. The transformation corresponds to the translation of the virtual object and/or to the rotation of the virtual object and/or to the scaling of the virtual object. The transformation may for example be expressed under the form of one or more matrices. The transformation may be applied to only a part of the virtual object, for example when applying a deformation to this part of the virtual object. When the virtual object is modelled from a mesh of polygons, the transformation is applied to the polygons (or part of them) or to the vertices of the polygons (or part of them).

In a step 73, one or more first visible parts of the transformed virtual object are rendered by using texture information obtained from the one or more images of the real object received at step 71. The texture information that is obtained from the one or more received images may be selected from one or more second parts of the real objects corresponding to the one or more first parts of the virtual object (the virtual object being a virtual replica of the real object). The selection may be performed based on an information representative of the visibility of the one or more second parts, i.e. an information establishing whether a second part is visible or not.

In an optional step, one or more images of the scene augmented with the rendered first part(s) of the virtual object are transmitted to a display device for displaying.

FIG. 8 diagrammatically shows an exemplary hardware embodiment of an apparatus 8 configured for rendering and/or compositing and/or transmitting one or more images of an augmented reality scene. The device 8 may also configured for the creation of display signals of the one or more images. The device 8 may correspond for example to a tablet, a Smartphone, a games console, a computer, a laptop or a Set-top box.

The apparatus 8 is a general computing device and may comprise the following elements, connected to each other by a bus 85 of addresses and data that also transports a clock signal:
- a microprocessor 81 (or CPU),
- a graphics card 82 comprising:
    - several Graphical Processor Units (or GPUs) 820,
    - a Graphical Random Access Memory (GRAM) 821,
- a non-volatile memory of ROM (Read Only Memory) type 86,
- a Random Access Memory or RAM 87,
- a transmitter 88 configured to transmit data representative of the one or more image,
- a receiver 89 configured to receive data from an acquisition device acquiring one or more images of a real scene comprising the one or more real objects;
- one or several I/O (Input/Output) devices 84 such as for example a tactile interface, a mouse, a webcam, etc. and
- a power source 89.

The apparatus 8 may also comprise one or more display devices 83 of display screen type directly connected to the graphics card 82 to display images calculated in the graphics card, for example live. The use of a dedicated bus to connect the display device 83 to the graphics card 82 offers the advantage of having much greater data transmission bitrates and thus reducing the latency time for the displaying of images composed by the graphics card. According to a variant, a display device is external to the apparatus 8 and is connected to the apparatus 8 by a cable or wirelessly for transmitting the display signals. The apparatus 8, for example the graphics card 82, comprises an interface for transmission or connection (not shown in FIG. 8) adapted to transmit a display signal to an external display means such as for example the first display device (e.g. an HMD), a LCD or plasma screen or a video-projector.

It is noted that the word "register" used in the description of memories 821, 86, and 87 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 81 loads and executes the instructions of the program contained in the RAM 87.

The random access memory 87 notably comprises:
- in a register 870, the operating program of the microprocessor 81 responsible for switching on the apparatus 8,
- data 871 representative of the image(s) representative of the real object(s) (e.g. texture information, for example RGB data),
- information 872 representative of the pose of the acquisition device acquiring the image(s) of the real object(s),
- data 873 representative of the virtual object (e.g. 3D model);
- optionally data representative of a mapping table.

The algorithms implementing the steps of the method(s) specific to the present disclosure (e.g. the method of rendering the scene and/or the method of transmitting data representative of the scene augmented with the transformed virtual object(s)) are stored in the memory GRAM 821 of the graphics card 82 associated with the apparatus 8 implementing these steps. When switched on and once the data 581 and the information 872 are loaded into the RAM 87, the graphic processors 820 of the graphics card 82 load these parameters into the GRAM 821 and execute the instructions of these algorithms in the form of microprograms of "shader" type using HLSL (High Level Shader Language) language or GLSL (OpenGL Shading Language) for example.

The random access memory GRAM 821 notably comprises:
- in a register, data representative of the images of the real scene comprising the real object(s);
- in a register, data representative of the images of the real scene augmented with the transformed virtual object(s);
- in a register, data representative of the pose information;
- in a register, data representative of the transformed virtual object(s);
- optionally, in a register, data representative of the mapping table.

According to a variant, the power supply 89 is external to the apparatus 5.

In an alternate embodiment, the apparatus 8 does not include any ROM but only RAM, the algorithms implementing the steps of the method specific to the present disclosure and described with regard to FIG. 4, 5, 6 or 7 being stored in the RAM. According to another variant, the apparatus 8 comprises a SSD (Solid-State Drive) memory instead of the ROM and/or the RAM.

Naturally, the present disclosure is not limited to the embodiments previously described.

In particular, the present disclosure is not limited to a method of rendering a scene but also extends to a method of transmitting data representative of the real scene augmented with the transformed virtual object (and a device configured for implementing the same) or to a method of displaying image(s) of the augmented scene (and corresponding device).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of rendering a scene comprising at least one real object, the method comprising:
    receiving at least one image representative of said scene;
    applying a transformation to a virtual object corresponding to a real object;
    displaying, in said at least one image, at least a part of said transformed virtual object by using texture information associated with said real object in said at least one image, the texture information being selected according to an information representative of visibility, in said at least one image, associated with at least a part of said real object that corresponds to said at least a part of said transformed virtual object, wherein:
        if said at least a part of said real object is visible, the texture information to be used for displaying corresponds to the texture information of said at least a part of said real object;
        if said at least a part of said real object is not visible, the texture information to be used for rendering displaying corresponds to a part of said real object selected according to a mapping information associating different parts of a 3D model of said real object with each other.

2. The method according to claim 1, wherein said mapping information is comprised in a mapping table, wherein each first part of the 3D model is associated with at least one second part of the 3D model different from said first part.

3. The method according to claim 2, wherein said first part being associated with a plurality of second parts of the 3D model, an index representative of preference being associated with each second part, a second part of said plurality of second parts being selected when said first part is not visible according to information representative of visibility associated with said second part and according to the index associated with said second part.

4. The method according to claim 1, wherein said mapping information is established based on the normal associated with the different parts of the 3D model.

5. The method according to claim 1, wherein said mapping information is established based on color information associated with different parts of the 3D model.

6. The method according to claim 1, wherein said texture information is obtained from a texture map updated with texture data of a plurality of images representative of the scene, a timestamp being associated with said texture data, said timestamp depending from the image of the plurality of images used to update the texture map.

7. The method according to claim 6, wherein the updating of said texture map is dependent from at least one of the following information:
    normal associated with the at least a part of said transformed virtual object associated with the texture data;
    timestamp information associated with the texture data;
    position of an acquisition device with regard to the at least one real object.

8. A device configured to render a scene comprising at least one real object, the device comprising:
    a receiver configured to receive at least one image representative of said scene;
    a processor configured to apply a transformation to a virtual object corresponding to a real object;
    a display device configured to display, in said at least one image, at least a part of said transformed virtual object by using texture information associated with said real object in said at least one image, the texture information being selected according to an information representative of visibility, in said at least one image, associated with at least a part of said real object that corresponds to said at least a part of said transformed virtual object, wherein:
        if said at least a part of said real object is visible, the texture information to be used for displaying corresponds to the texture information of said at least a part of said real object;
        if said at least a part of said real object is not visible, the texture information to be used for displaying corresponds to a part of said real object selected according to a mapping information associating different parts of a 3D model of said real object with each other.

9. The device according to claim 8, wherein said mapping information is comprised in a mapping table, wherein each first part of the 3D model is associated with at least one second part of the 3D model different from said first part.

10. The device according to claim 9, wherein said first part being associated with a plurality of second parts of the 3D model, an index representative of preference being associated with each second part, a second part of said plurality of second parts being selected when said first part is not visible according to information representative of visibility associated with said second part and according to the index associated with said second part.

11. The device according to claim 8, wherein said mapping information is established based on the normal associated with the different parts of the 3D model.

12. The device according to claim 8, wherein said mapping information is established based on color information associated with different parts of the 3D model.

13. The device according to claim 8, wherein said at least one processor is configured to obtain the texture information from a texture map updated with texture data of a plurality of images representative of the scene, a timestamp being associated with said texture data, said timestamp depending from the image of the plurality of images used to update the texture map.

14. The device according to claim 13, wherein the update of said texture map is dependent from at least one of the following information:
    normal associated with the at least a part associated with the texture data;
    timestamp associated with the texture data;
    position of an acquisition device with regard to the at least one real object.

15. A non-transitory processor readable medium having stored therein instructions for causing a processor to perform at least the method according to claim 1.

* * * * *